United States Patent
Jeong (10) Patent No.: US 6,288,983 B1
(45) Date of Patent: Sep. 11, 2001

(54) METHOD AND APPARATUS FOR CONTROLLING MOVEMENT OF OPTICAL PICK-UP IN AN OPTICAL DISC PLAYER

(75) Inventor: Hong-Jo Jeong, Kyunggido (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/271,282

(22) Filed: Mar. 17, 1999

(30) Foreign Application Priority Data

Mar. 18, 1998 (KR) .................................................. 98-9370

(51) Int. Cl.[7] .................................................. G11B 17/22
(52) U.S. Cl. .................................................. 369/33; 369/215
(58) Field of Search .................... 369/33, 32, 44.28, 369/44.29, 44.27, 215

(56) References Cited

U.S. PATENT DOCUMENTS

| | | | |
|---|---|---|---|
| 5,175,716 | * 12/1992 | Min | 369/44.11 |
| 5,375,108 | * 12/1994 | Suzuki | 369/44.28 |
| 5,563,856 | * 10/1996 | Kim | 369/32 |
| 5,721,718 | * 2/1998 | Hwang | 369/58 |
| 5,726,959 | * 3/1998 | Yu | 369/32 |
| 5,764,602 | * 6/1998 | You et al. | 369/32 |
| 5,802,019 | * 9/1998 | Yamada | 369/32 |
| 5,808,982 | * 9/1998 | Yun | 369/44.28 |
| 6,137,751 | * 10/2000 | Kim | 369/32 |

* cited by examiner

Primary Examiner—Tan Dinh (57) ABSTRACT

A method and apparatus for controlling the movement of an optical pickup between tracks in an optical disc player, which makes it possible to access to a target track quickly by adjusting a sled motor driving signal on the basis of the load applied to the sled motor that moves the optical pickup. The method and apparatus controls the moving distance of the optical pickup accurately by taking into account the load applied to the sled motor thus facilitating access to a target track at high speeds.

12 Claims, 11 Drawing Sheets

METHOD AND APPARATUS FOR CONTROLLING MOVEMENT OF OPTICAL PICK-UP IN AN OPTICAL DISC PLAYER

BACKGROUND OF THE INVENTION

1. Field of the Invention

The present invention relates to a method and apparatus for controlling the movement of an optical pickup in an optical disc player, more particularly, a method and apparatus for adjusting the driving signal, which is to be supplied to a sled motor, to move an optical pickup between tracks radially in an optical disc player.

2. Description of the Related Art

Figure 1:
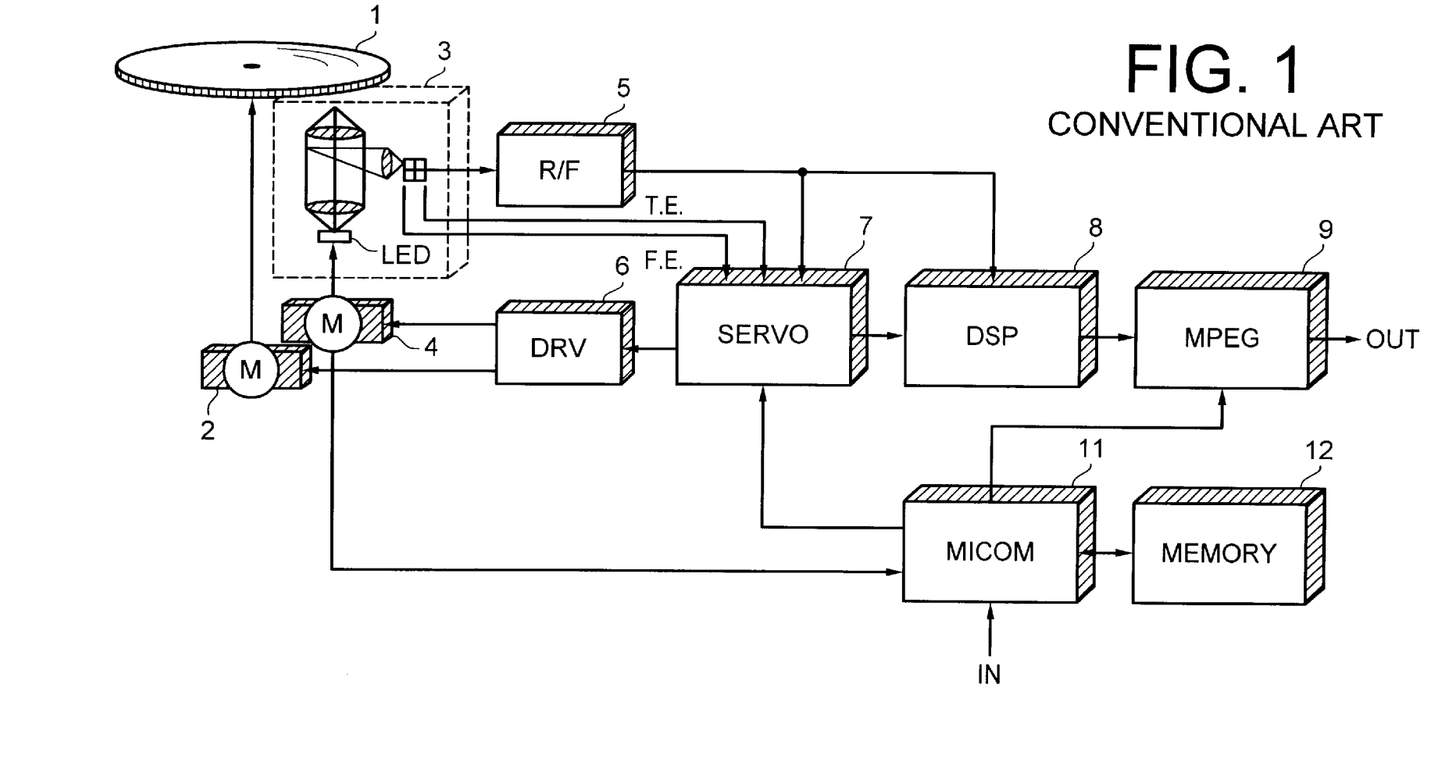
FIG. 1 is a schematic diagram showing a conventional art optical disc player.

Referring to FIG. 1, a general optical disc player that reproduces optical discs in which MPEG-encoded digital data are stored comprises a pickup 3 for reading out information recorded in an optical disc 1 by using a light beam irradiated by its LED (laser emitting diode); a sled motor 4 for moving the pickup in the radial direction of the optical disc 1; a spindle motor 2 for rotating the optical disc 1; a driving unit 6 for driving the sled motor 4 and the spindle motor 2; a RF (radio-frequency) amplifier 5 for amplifying a signal picked up by the pickup 3; a servo unit 7 for servo-controlling the driving unit 6 based on focus error signal, tracking error signal, and the rotational speed of the optical disc 1 and extracting synchronization signal from the output signal of the RF amplifier 5; a DSP (digital signal processor) 8 for filtering the signal from the RF amplifier 5 and for demodulating the filtered signal; an MPEG decoder 8 for decoding the demodulated data from the DSP unit 8; a MICOM (microcomputer) 11 for controlling the data flow between the above-mentioned components; and a memory 12 for temporarily storing the decoded digital data.

In an optical disc player configured as shown in FIG. 1, details of track jump operation are as follows. To move pickup 3 from a present track to a target track in response to a search mode command entered into the MICOM 11, the MICOM 11 obtains positional information on a present track position at which the pickup 3 is located from reproduction control data which is provided from the DSP 8. And then, the MICOM 11 calculates the current track number of the pickup 3 by using the positional information. The positional information of the pickup 3 is represented by MSB (minute/second/block) date where the optical disk 1 is a CD (compact disc). In case of a digital video disc (DVD), the positional information is represented by the track number. The number of tracks for the pickup 3 to traverse and the direction (toward the inner circumference or the outer circumference) are obtained by subtracting the current track number from the target track number.

By multiplying the number of tracks to traverse by the standard track pitch, the MICOM 11 calculates the moving distance of the pickup 3 to the target track. The MICOM 11 controls the driving unit 6 through the servo unit 7 in order that the driving unit 6 supplies a driving signal to the sled motor 4. The sled motor 4 rotates for a period of time in which the driving signal is applied so that the pickup 3 is moved to the target track.

After the pickup 3 is moved for the aimed distance, the present location of the pickup 3 is read out again from the optical disc 1 to determine if the pickup 3 is located at the target track. If the location is not the target track, the pickup is further moved until the pickup is located at the target track. That is, fine search process is performed to complete the track jump operation.

Therefore, when a long jump operation between tracks is performed, the pickup 3 is positioned at the target track as close as possible in order to shorten the time for the fine search operation and thereby achieve high-speed access.

Figure 2:
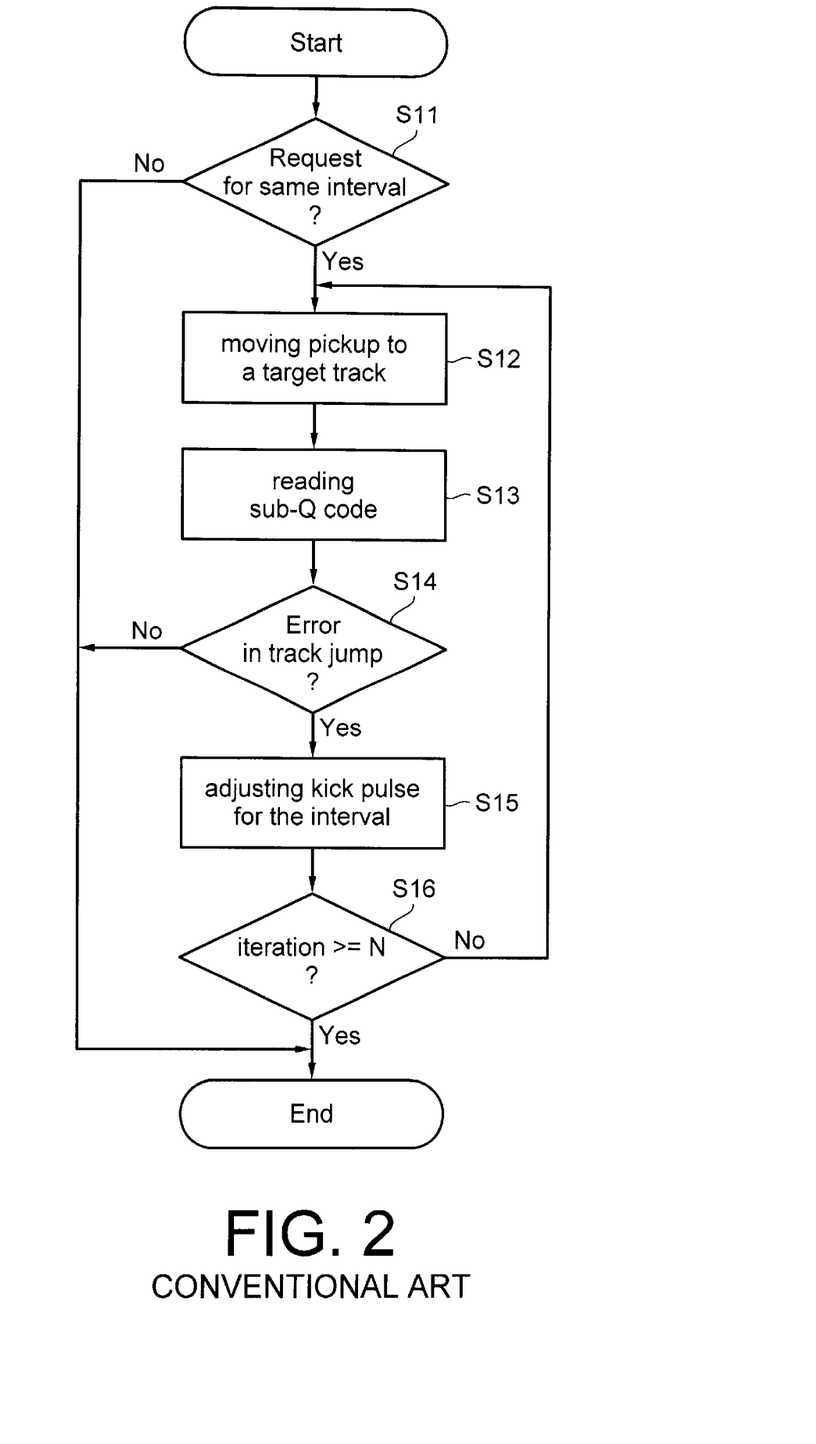
FIG. 2 is a flowchart of the conventional art method for controlling movement of an optical pickup between tracks.

FIG. 2 is a flow chart according to the conventional art method for controlling the movement of an optical pickup in an optical disc player, which will be described now in detail. If there is a request to move the pickup for the same distance as that of previous movements (S11), an adjustment operation in which a driving pulse for driving the sled motor is performed for a predetermined number of times. To be specific, first, the pickup 3 is moved to a target track by supplying a driving pulse to the sled motor 4 (S12). A sub-Q code, which contains the information regarding the current location of the pickup 3, is read from the track at which the pickup 3 is currently located and is then used to calculate a track error signal (S13). If there is any track error (S14), the shape of the sled motor driving pulse (kick pulse) is changed with accordance with the track error signal (S15). Next, the number of iterations is checked to determine whether to terminate this operation (S16). If it is less than the predetermined number of times ("N"), the pickup 3 is moved back to the initial track and then the process of steps S12 to S16 is repeated with the adjusted driving pulse.

Figure 3A:
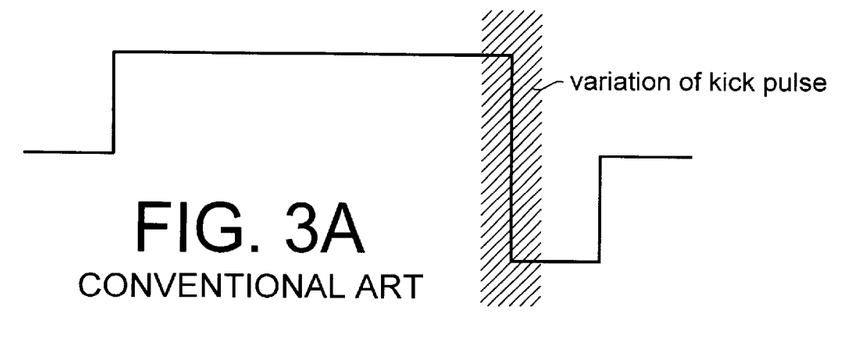
FIGS. 3A and 3B are two waveforms of the sled motor driving pulse for peak level adjustment and pulse width adjustment, respectively.
Figure 3B:
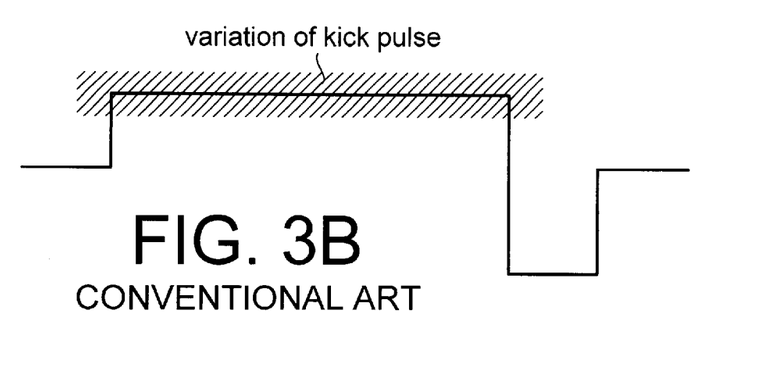

In short, in the conventional art method, the sled motor driving pulse signal is adjusted repeatedly in such a manner that the pickup 3 is moved to the target track as precisely as possible, or the track error is minimized each time the pickup is moved from the current track to the target track. Peak level or width of the sled motor driving pulse is adjusted to compensate for the feedback track error, as shown in FIGS. 3A and 3B.

However, the movement of the pickup according to the conventional art method may not be accurate for distances other than the moving distance used in the iterative adjustment of the sled motor driving pulse. The conventional art method is, moreover, used only when an optical disc is loaded in optical disc players because it needs to read sub-Q code from the optical disc in order to be aware of the current location of the pickup.

The conventional art method for controlling the movement of the pick does not deal with deviations in access time across optical disc players by slight deviation between optical disc players. That is, due to frictional resistance between the sled rail and the sled motor and mass thereof, the load applied to the sled motor shaft is different from one player to another, resulting in great delay to access target data tract in a certain optical disc player.

SUMMARY OF THE INVENTION

It is therefore a primary object of the present invention to provide a method and apparatus for moving an optical pickup to a target track in a high-speed optical disc player by taking into account a load applied to a sled motor that moves the optical pickup.

To achieve the object, the present invention provides an apparatus for controlling the movement of an optical pickup between tracks, comprising a means for detecting a signal which is generated during a movement of the optical pickup; a means for counting the number of pulses of the detected signal; a means for measuring the time elapsed during the movement of the optical pickup; a means for calculating a load that is applied to a moving means for moving the optical pickup by using the counted number of pulses and the elapsed time; a means for controlling a driving signal of the moving means on the basis of the calculated load.

A method for controlling movement of an optical pickup between tracks according to the present invention comprises the steps of calculating a load applied to the moving means for moving the optical pickup while the optical pickup is moved for a predetermined distance; and controlling a driving signal of the moving means on the basis of the calculated load.

The method according to the present invention is also characterized in that it comprises moving the optical pickup for a predetermined period of time; detecting the moved distance of the optical pickup based on an amount of rotation of the moving means; calculating a load that is applied to the moving means based on the moved distance of the optical pickup; and controlling a driving signal that is supplied to the moving means on the basis of the calculated load.

In a preferred embodiment of the present invention, the detecting means detects a signal that is generated in accordance with a movement of an optical pickup, and the number of pulses of the detected signal is counted by the counting means. The measuring means provides the time elapsed until the movement of the optical pickup is completed. Then, the calculating means calculates a load that is applied to a moving means for moving the optical pickup by using the counted number of pulses and the elapsed time. Finally, a driving signal for the moving means of the optical pickup is controlled by the controlling means on the basis of the calculated load.

In another preferred embodiment of the present invention, the optical pickup is moved for a predetermined period of time. During the movement of the optical pickup, the traversed distance of the optical pickup is detected by the detecting means on the basis of the amount of rotation of the moving means for moving the optical pickup. Next, a load applied to the moving means is calculated by the calculating means from the traversed distance. Then, a driving signal that drives the moving means for moving the optical pickup is controlled based on the calculated load.

BRIEF DESCRIPTION OF THE DRAWINGS

The accompanying drawings, which are included to provide a further understanding of the invention, illustrate the preferred embodiment of this invention, and together with the description, serve to explain the principles of the present invention.

In the drawings.

DETAILED DESCRIPTION OF THE PREFFERRED EMBODIMENT

The preferred embodiments of the present invention will be described below in detail referring to the accompanying drawings.

Figure 4:
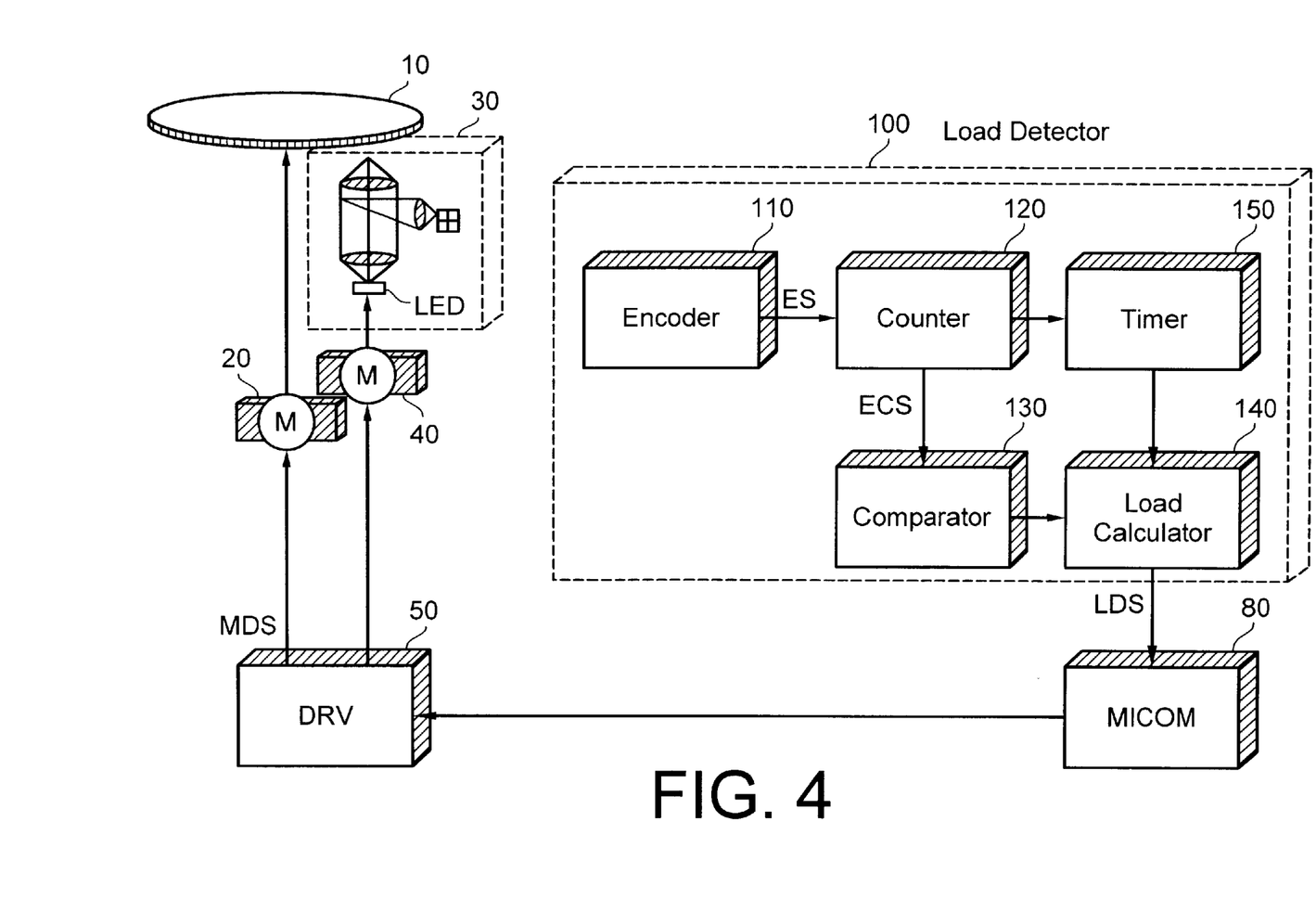
FIG. 4 is a schematic diagram showing an embodiment of the present invention.

FIG. 4 shows an apparatus for controlling movement of the optical pickup between tracks according to an embodiment of the present invention. As shown in FIG. 4, the apparatus comprises a pickup 30 for reading out information recorded in an optical disc 10 by using a light beam irradiated by an LED; a sled motor 40 for moving the pickup 30 in the radial direction of the optical disc 10; a spindle motor 20 for rotating the optical disc 10; a driving unit 50 for driving the sled motor 40 and the spindle motor 20; an encoder 110 for producing a signal in accordance with the moving distance of the pickup; a counter 120 for counting the number of pulses of the signal generated by the encoder; a comparator 130 for comparing the counted number of pulses with a predetermined number; a timer 150 for counting the time it takes for the number of pulses corresponds to the predetermined number; a load calculator 140 for calculating a load applied to the sled motor 40 on the basis of the time elapsed; a MICOM 80 for controlling a sled motor driving signal according to the calculated load. Either stepping motor or DC motor is used for the sled motor 40. While the sled motor 40 moves the pickup 30, a slit plate 41 of the encoder 110 rotates in response to the driving force of the sled motor 40. Thus, an electrical signal is generated by the encoder 110 in accordance with light passing through the slits 42 on the slit plate 41. Then, the number of pulses of the generated signal is counted by the counter 120 and then the moved distance of the pickup 30 is detected from the counted number of pulses.

With reference to flow chart of FIG. 9 and FIGS. 4 and 6, the method for controlling movement of an optical pickup between tracks according to the present invention will be described now in detail.

Figure 6:
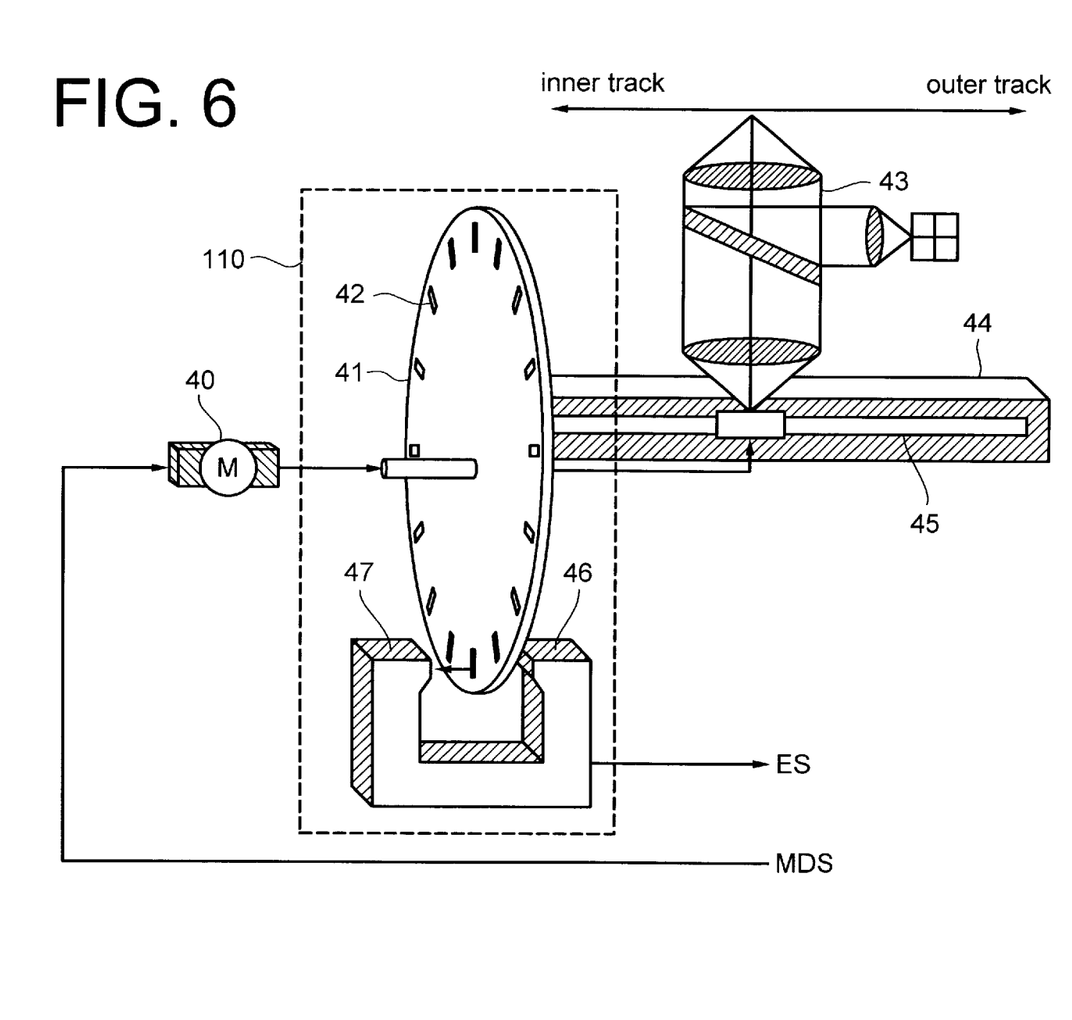
FIG. 6 is a schematic diagram showing an apparatus for load detection according to the present invention.

FIG. 6 depicts a detailed diagram of components for detecting the moving distance of the pickup in the apparatus of FIG. 4. As shown in FIG. 6, as the pickup 43 is moved by the sled motor 40, along V-shape groove 45 on a sled rail 44, the slit plate 41 rotates in proportion to the moved distance of the pickup 43. At this time, light emitted from LED 46 passes through the slits 42 and is detected by the photo detector 47. As a result, an electrical signal of pulses proportional to the moved distance of the pickup 43 (ES) is produced and used by the MICOM 80 to estimate the load applied to the shaft of the sled motor 40.

The load applied to the shaft of the sled motor 40 by the sled rail 44 and the sled motor 40 can be estimated by using a photo detector as shown FIG. 6 or step pulses from a stepping motor at the time of manufacturing an optical disc player.

Figure 9:
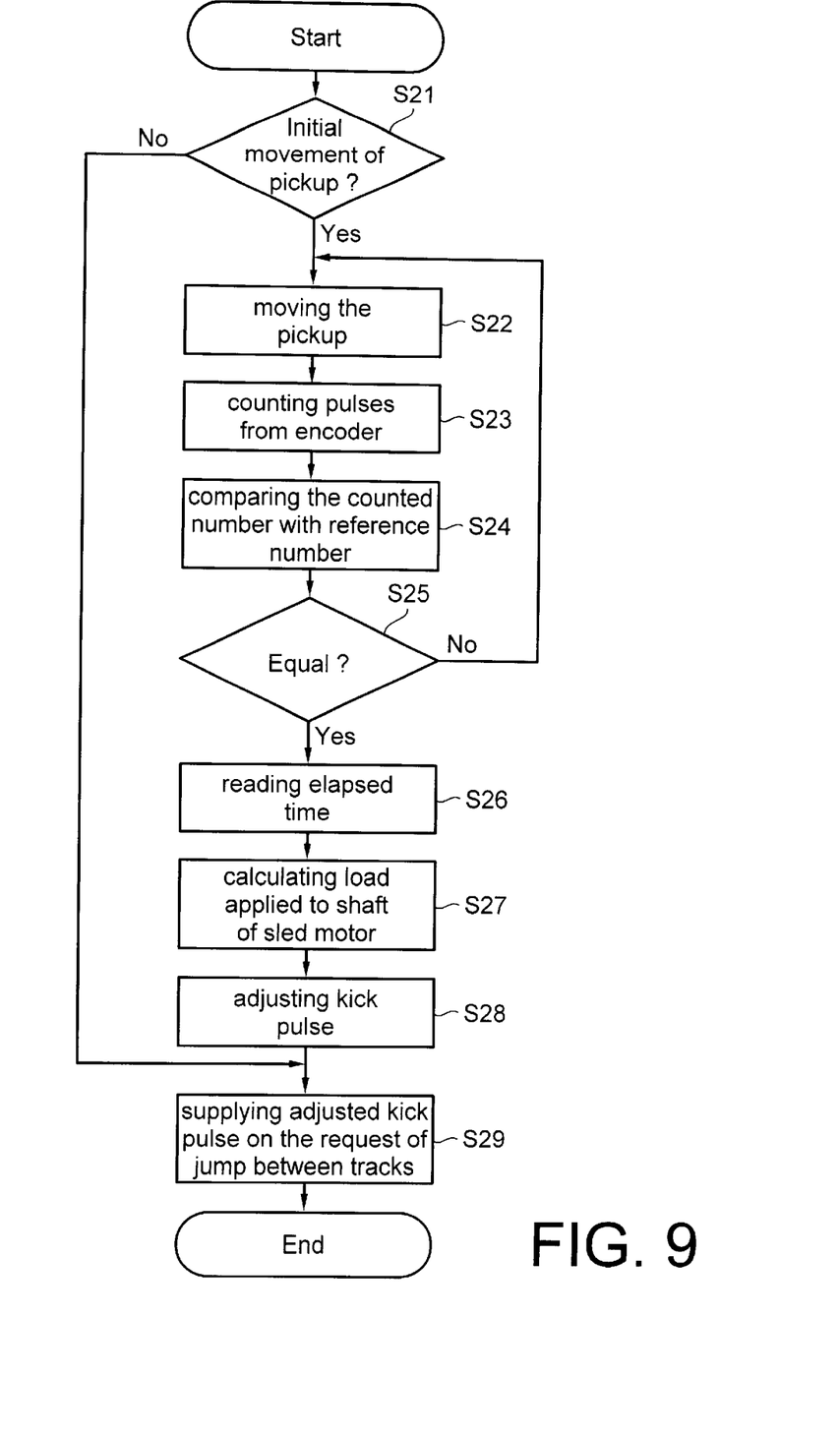
FIG. 9 is a flowchart showing a method for the apparatus of the embodiment shown in FIG. 4.

As illustrated in FIG. 9, when the pickup 30 is to be moved for the first time (S21), the pickup 30 is driven to move for a predetermined distance, for example, from the inner-most circumference to the outer-most circumference by the sled motor (S22). Thus, a signal (ES) corresponding to the traversed distance of the pickup 30 is generated by the encoder 110. In one embodiment the slit plate 41 has twenty two slits.

Then, the number of pulses of the signal ES is counted by the counter 120 (S23). The counted number of pulses is compared with a reference value, or the number of pulses that must be counted when the pickup has been moved exactly for the predetermined distance (S24), and it is checked whether or not they become equal to each other (S25). When it is determined that the number of pulses corresponds to the reference value, the time elapsed since the start of movement of the pickup is read (S26). The load applied to the sled motor shaft is calculated based on the elapsed time (S27). The principle behind calculation of the load is that the time it takes for the pickup to move an aimed distance depends on the load that is applied to the sled motor shaft.

Next, a driving pulse that is required for the pickup to move for the predetermined moving distance, so-called kick pulse (MDS), is adjusted according to the calculated load LDS (S28). Specifically, the peak level or pulse duration of the kick pulse is changed, as shown in FIGS. 3A and 3B. The adjusted kick pulse is then supplied to the sled motor to move the pickup (S29).

Figure 5:
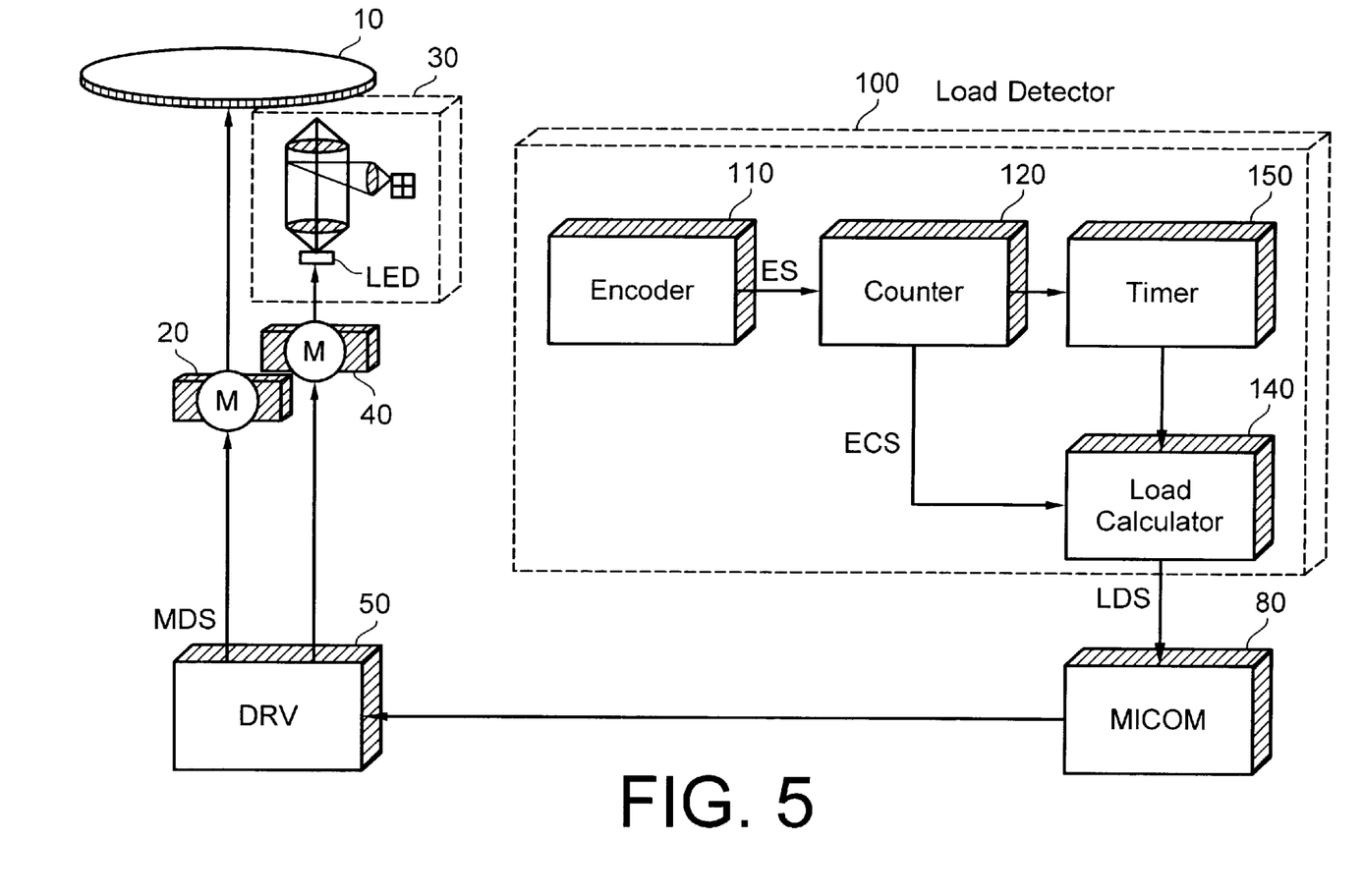
FIG. 5 is a schematic diagram showing another embodiment of the present invention.

FIG. 5 shows an apparatus for controlling movement of the optical pickup between tracks according to another embodiment of the present invention. As shown in FIG. 5, the apparatus comprises an encoder 110 for detecting an electrical signal in accordance with a moving distance of the pickup 30; a counter 120 for counting the number of pulses of the signal from the encoder; a timer 150 for counting the time it takes for the pickup to move an aimed distance; a load calculator 140 for calculating a load applied to the shaft of the sled motor on the basis of the difference between the time elapsed and a predetermined duration of time; a MICOM 80 for controlling a driving signal for movement of the pickup 30 according to the calculated load. This embodiment is the same as that of FIG. 4, except that comparator 130 of FIG. 4 is not included.

Figure 10:
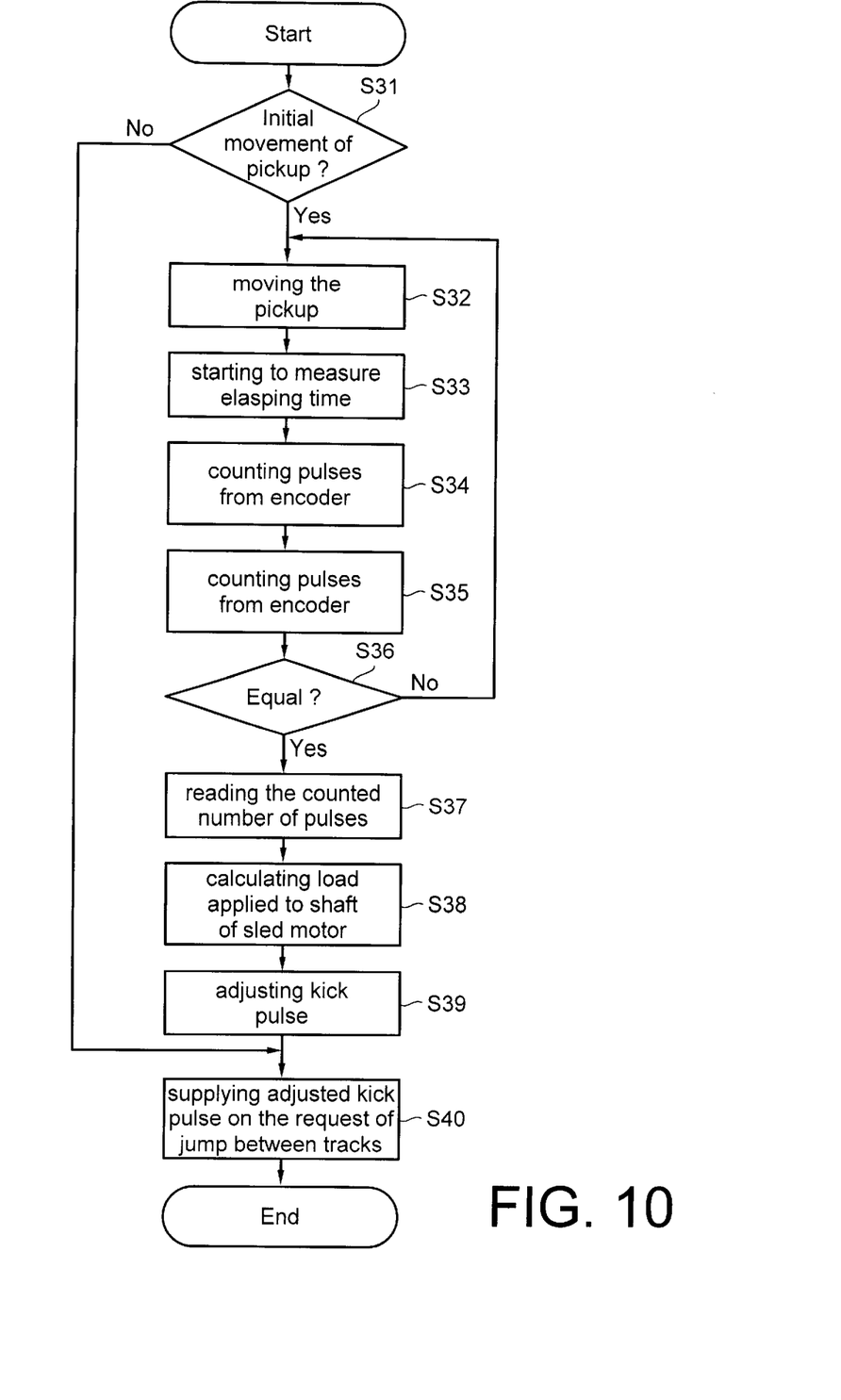
FIG. 10 is a flowchart showing a method for the apparatus of the embodiment shown in FIG. 5.

This embodiment will be described below in detail referring to flow chart of FIG. 10 and FIG. 5.

When the pickup 30 is to be moved for the first time (S31), the pickup 30 starts to move for a predetermined distance (S32). At the same time, the time elapsed since the movement of the pickup 30 begins to be counted (S33). And then, the number of pulses of the signal generated in accordance with the movement of the pickup 30 is counted and a signal corresponding to the number of pulses (ES) is produced (S34). Next, a comparison is made as to whether or not the elapsed time corresponds to a reference period of time that it generally takes for the pickup to move exactly for the predetermined distance (S35, S36). Once the measured time and reference time period correspond, the number of pulses of the signal ES that has been counted is read out (S37) and is then used to calculate the difference between the actually moved distance and the predetermined distance corresponding to the reference period of time (S37). The load applied to the sled motor (LDS) is calculated based on the distance difference (S38).

Next, the kick pulse that is required to move the pickup the predetermined moving distance is adjusted by using the calculated load LDS (S39). The sled motor is then driven according to the adjusted kick pulse (S40). Specifically, the peak level or pulse duration of the kick pulse is changed, as shown in FIGS. 3A and 3B, to drive the sled motor so that the pickup is moved to a target track as closely as possible.

Figure 8:
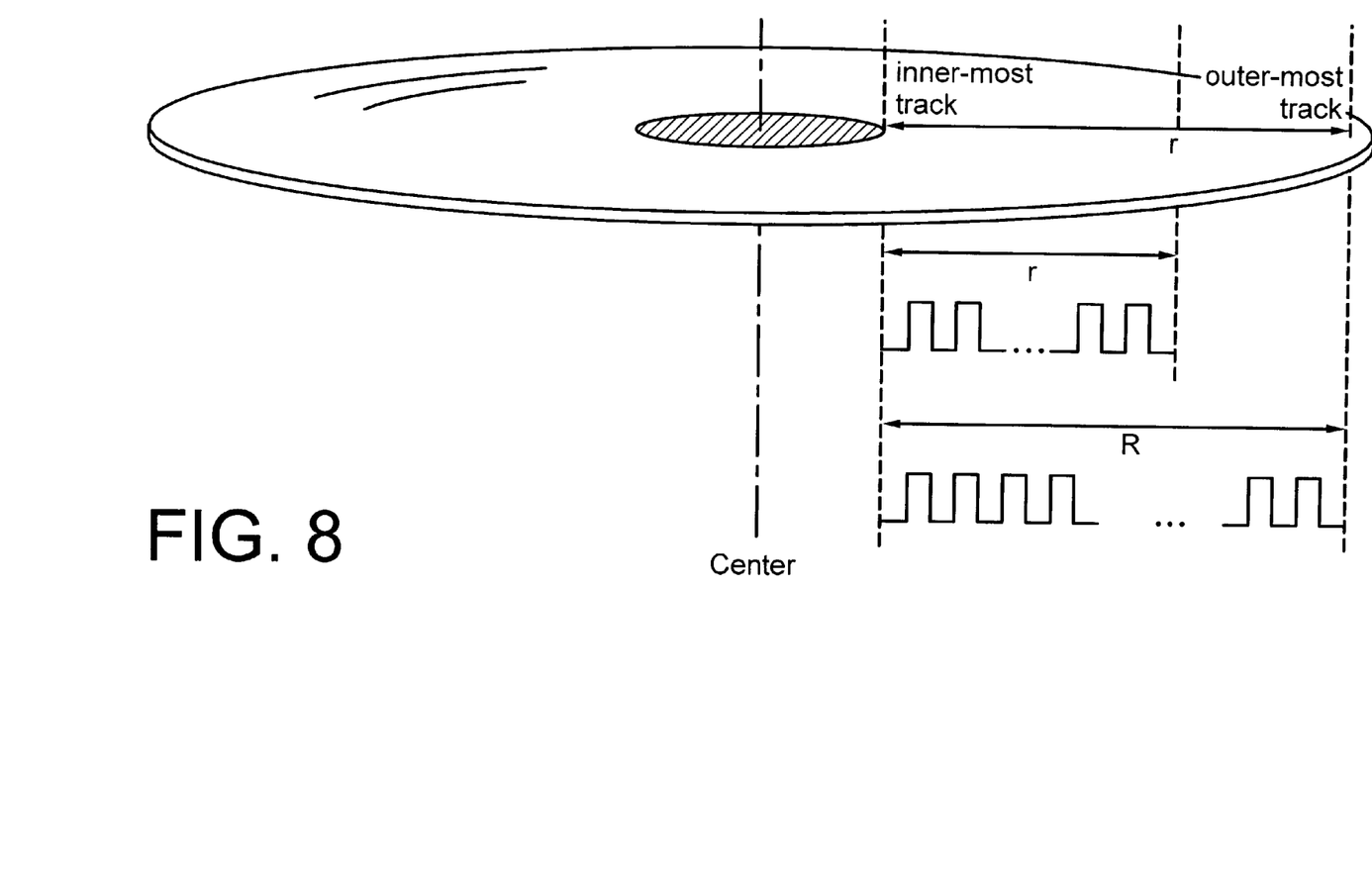
FIG. 8 is a schematic diagram showing sled motor driving pulses according to an embodiment of the present invention.

FIG. 8 is a graphic diagram for illustrating pulses generated from the encoder 110. Regardless of whether the optical disc is loaded or not, the pickup 30 is moved for a predetermined distance, e.g., from the inner-most track to the outer-most track. While the pickup is moved the predetermined distance, the number of pulses generated by the encoder is counted and the time elapsed during movement of the pickup is also counted. The load applied to the sled motor shaft is estimated by using both the elapsed time and the number of pulses. After that, where the pickup is asked to traverse a distance of r, the adjustment of sled motor driving signal is made by taking into account the estimated load.

Figure 7:
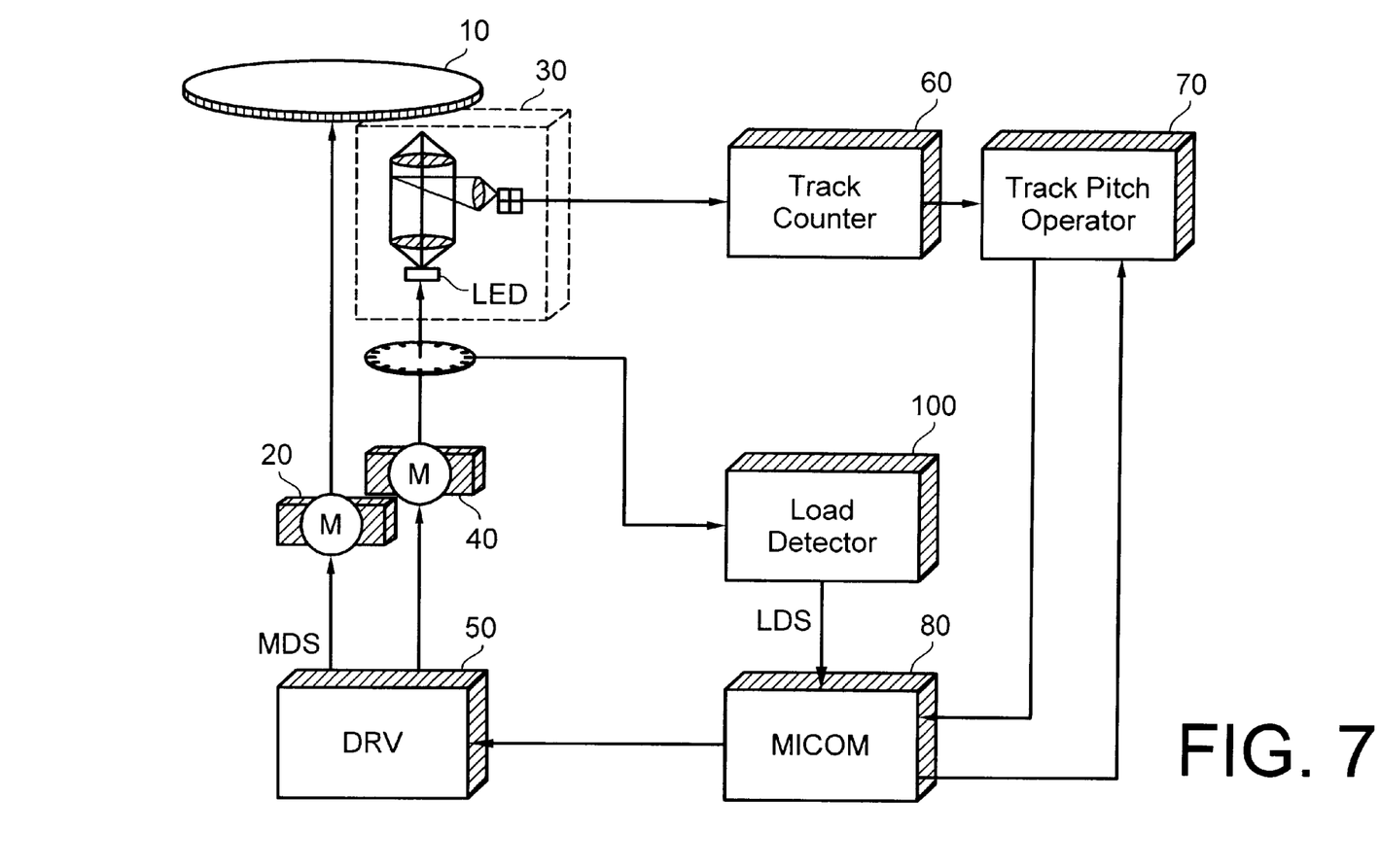
FIG. 7 is a schematic diagram showing another embodiment of the present invention.

FIG. 7 shows an apparatus for controlling movement of the optical pickup between tracks according to another embodiment of the present invention. As shown therein, the apparatus is the same as that of FIG. 4, except that a track counter 60 and a track pitch operator 70 are further included. This embodiment will be described below in detail with reference to the flow chart of FIG. 11 and FIG. 7.

Figure 11:
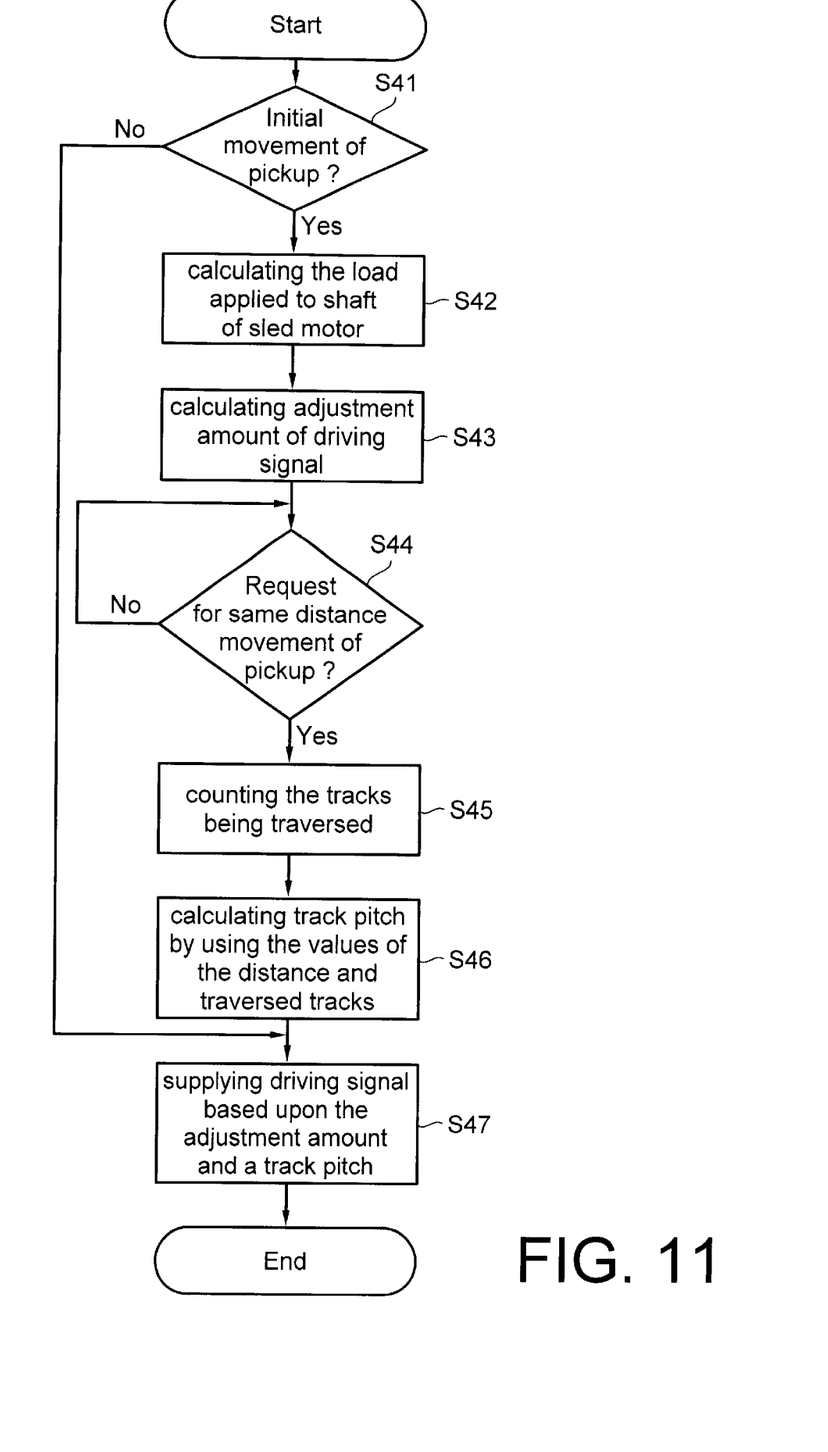
FIG. 11 is a flowchart showing a method for the apparatus of the embodiment shown in FIG. 7.

Upon initial movement of the pick (S41), the load applied to the sled motor shaft is calculated by using the procedure of FIG. 9 (S42) and an amount of adjustment of the pulse width or peak level of driving signal is determined based on the load (S43). Then, the steps for detecting track pitch of the optical disc are executed, which will be explained below in detail.

With an optical disc being loaded, if the pickup is moved an aimed distance (S44), the MICOM 80 supplies driving pulses to the driving unit 50 in order to move the pickup for the aimed distance. The sled motor 40, which is a stepping motor or DC motor, is driven in turn. A slit plate 41 is needed in case of DC motor, but not for stepping motor.

The pickup 30 is moved exactly the aimed distance by applying the adjusted driving signal to the sled motor 40. And then, a reproduction control information (sub-Q code) is read out at the moved location at which the optical disc 10 is located and is then inputted to the MICOM 80. Track positional information (MSB) is extracted from the sub-Q code and the current track number is calculated from the MSB information. Next, the number of tracks is counted that the pickup 30 have traversed over from the initial location (track 0 or track 1) to the current location (S45).

By dividing the moved distance by the number of tracks, the track pitch is obtained and is then stored for further use in a subsequent track jump (S46). After that, if a search mode command is inputted to the MICOM 80 during reproduction of the optical disc 10, a positional information, i.e., MSB of the target track is calculated based on a reproduction control information which is read out at the moment. The target track number is, in turn, computed from the positional information, and the number of tracks for the pickup 30 to traverse is calculated by subtracting the current track number from the target track number. The distance for the pickup to move to the target track is determined by multiplying the number of tracks by the track pitch. An amount of adjusting driving signal of the sled motor that is required for the pickup to move for calculated distance is determined (S47).

Then, the resulting driving signal, which has been adjusted in the previous load detecting steps, is supplied to the sled motor so that the pickup 30 is moved for the aimed distance (S47). In short, the method for moving the pickup on the basis of load applied to the sled motor enables to calculate the track pitch precisely and thus locate a target track as close as possible at a long jump.

In this embodiment of the present invention, a DC motor may be used for the sled motor instead of a stepping motor. In this case, a hall sensor and a counter for counting the output pulses of the hall sensor (not shown) are required to count the number of rotation of the DC motor in addition to components of the apparatus of FIG. 7.

Unlike the stepping motor, the DC motor requires the hall sensor to precisely move the pickup for an aimed distance because the rotational amount of DC motor is not controlled precisely. The number of pulses generated by means of the hall sensor is counted by the counter and is then inputted to the MICOM. An then, the MICOM stops driving of the DC motor immediately when it is determined that the pickup has been moved for the aimed distance.

A pulse width of the signal generated from the hall sensor corresponds to the distance of 50 to 100 tracks for the pickup to move, which depends on the type to which the hall sensor belongs. Thus, the precision of the moving distance of the pickup during a period of the pulse of the hall sensor is lower than that of stepping motor. Hence, a long aimed distance is preferred to obtain as a precise track pitch at possible. That is, the pickup is moved from the inner-most track to the outer-most track and then the track pitch is estimated from the movement of the pickup. As a result, the error of moving distance of the pickup in the subsequent track jump is minimized by virtue of the precisely estimated track pitch.

According to the present invention, in high-speed optical disc players, it is possible to move an optical pickup to a target track precisely irrespective of track pitch error of an optical disc by taking into account a load applied to the sled motor shaft. Furthermore, the present invention can be applied because the load can be detected even when an optical disc is not loaded in the optical disc player, for example, at the initial power-on.

The foregoing is provided only for the purpose of illustration and explanation of the preferred embodiments of the present invention, so changes, variations and modifications may be made without departing from the spirit and scope of the invention.

What is claimed is:

1. A method for controlling the movement of an optical pickup in an optical disc player, comprising the steps of:
    moving said optical pickup for a predetermined distance;
    counting the number of pulses of a signal which is generated in accordance with the moving distance of said optical pickup;
    checking whether or not the counted number of pulses corresponds to a predetermined number;
    measuring a time elapsed until said counted number of pulses corresponds to said predetermined number;
    calculating a load applied to a moving means for moving said optical pickup based on said elapsed time; and
    controlling a driving signal which drives said moving means on the basis of said calculated load.

2. A method for controlling the movement of an optical pickup in an optical disc player, comprising the steps of:
    (a) detecting a load which is applied to a moving means for moving said optical pickup after said optical pickup is moved for some distance;
    (b) calculating an amount of adjustment of a driving signal which drives said moving means according to said detected load;
    (c) obtaining the number of tracks traversed by said optical pickup;
    (d) calculating the track pitch by using said obtained number of tracks; and
    (e) controlling a driving signal of said moving means on the basis of said adjustment amount and said calculated track pitch.

3. A method according to claim 2, wherein said step (a) detects said load by counting a period of time elapsed until the movement of said optical pickup for said distance is completed.

4. A method according to claim 2, wherein said step (e) adjusts a peak level of said driving signal.

5. A method according to claim 2, wherein said step (e) adjusts a pulse width of said driving signal.

6. An apparatus for controlling the movement of an optical pickup in an optical disc player, comprising:
    a means for detecting a signal generated during the movement of said optical pickup;
    a means for counting the detected signal;
    a means for comparing the counted number of the signal with a preset number; and
    a means for calculating a load applied to a pickup moving means according to a output signal of said comparing means and controlling a driving signal of said pickup moving means based on the calculated load, wherein the load is calculated to a value proportional to the time elapsed until the output signal of said comparing means becomes zero.

7. An apparatus for controlling the movement of an optical pickup in an optical disc player, comprising:
    a means for measuring the elapsing time during the movement of said optical pickup;
    a means for comparing the elapsed time being measured with the reference time; and
    a means for calculating a load applied to a pickup moving means by using the distance of the movement at the time when both time are equal, and controlling a driving signal of said pickup moving means based on the calculated load.

8. An apparatus according to claim 7, wherein the load is calculated to a value proportional to the number of signal generated until the elapsed time and the reference time are equal.

9. An apparatus for controlling the movement of an optical pickup in an optical disc player, comprising:
    a means for detecting a signal generated during the movement of said optical pickup;
    a means for counting the number of pulses of said detected signal;
    a means for measuring time elapsed during the movement of said optical pickup;
    a means for calculating a load which is applied to a moving means for moving said optical pickup by using said counted number of pulses and said elapsed time; and
    a means for controlling a driving signal of said moving means on the basis of said calculated load.

10. An apparatus according to claim 9, wherein the load is calculated based on the time elapsed until the counted number becomes equal to a preset number.

11. An apparatus according to claim 9, wherein the load is calculated based on the number of pulses counted until the measured time becomes equal to a reference time.

12. An apparatus for controlling the movement of an optical pickup in an optical disc player, comprising:
    a means for calculating a load which is applied to a moving means for moving said optical pickup after said optical pickup is moved for some distance;
    a means for obtaining the number of tracks traversed by said optical pickup;
    a means for calculating the track pitch based on said number of tracks; and
    a means for controlling a driving signal of said moving means on the basis of said calculated load and said calculated track pitch.

* * * * *